US012621882B2

(12) United States Patent
Ma

(10) Patent No.: US 12,621,882 B2
(45) Date of Patent: May 5, 2026

(54) TUNNEL REUSE FOR MULTICAST AND BROADCAST SERVICE

(71) Applicant: ZTE Corporation, Shenzhen (CN)

(72) Inventor: Zijiang Ma, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 318 days.

(21) Appl. No.: 18/057,373

(22) Filed: Nov. 21, 2022

(65) Prior Publication Data

US 2023/0080042 A1 Mar. 16, 2023

Related U.S. Application Data

(63) Continuation of application No. PCT/CN2020/092227, filed on May 26, 2020.

(51) Int. Cl.
H04W 76/12 (2018.01)
H04W 4/06 (2009.01)
H04W 28/12 (2009.01)

(52) U.S. Cl.
CPC ............. H04W 76/12 (2018.02); H04W 4/06 (2013.01); H04W 28/12 (2013.01)

(58) Field of Classification Search
CPC ..... H04W 76/40; H04W 72/30; H04W 76/12; H04L 12/18
See application file for complete search history.

(56) References Cited

U.S. PATENT DOCUMENTS

| | | | |
|---|---|---|---|
| 2016/0014572 A1 | 1/2016 | Vetter et al. | |
| 2019/0373666 A1 | 12/2019 | Khan | |
| 2020/0260233 A1 | 8/2020 | Yang et al. | |
| 2021/0068003 A1* | 3/2021 | Kadiri | H04L 1/1812 |
| 2021/0144594 A1 | 5/2021 | Liu et al. | |
| 2021/0274321 A1 | 9/2021 | Deng et al. | |
| 2021/0352444 A1* | 11/2021 | Griot | H04W 28/0268 |
| 2022/0295236 A1* | 9/2022 | Baek | H04W 88/08 |
| 2022/0322160 A1 | 10/2022 | Baek | |

(Continued)

FOREIGN PATENT DOCUMENTS

| | | |
|---|---|---|
| CN | 101529932 A | 9/2009 |
| CN | 109699013 A | 4/2019 |
| CN | 109792788 A | 5/2019 |

(Continued)

OTHER PUBLICATIONS

Extended European Search Report for European Patent Application No. 20895390.1, mailed Jun. 13, 2023 (13 pages).

(Continued)

*Primary Examiner* — Marcus Smith
*Assistant Examiner* — Rowan K Fakhro
(74) *Attorney, Agent, or Firm* — Perkins Coie

(57) ABSTRACT

Methods, apparatus, and systems for enabling effective reuse of a multicast or shared tunnel for a multicast and broadcast service are described. In one example aspect, a wireless communication method includes receiving, by a network node in a core network, information from a first access node requesting a multicast tunnel associated with a multicast and broadcast service, and transmitting, by the network node to (Continued)

450 the first access node, information about a shared tunnel associated with the multicast and broadcast service that has been established for a second access node.

20 Claims, 10 Drawing Sheets

(56) References Cited

U.S. PATENT DOCUMENTS

| | | | | |
|---|---|---|---|---|
| 2022/0329985 | A1* | 10/2022 | Liu | H04W 28/0268 |
| 2023/0209446 | A1* | 6/2023 | Kim | H04W 4/021 |
| | | | | 370/329 |

FOREIGN PATENT DOCUMENTS

| | | | |
|---|---|---|---|
| CN | 109845216 | A | 6/2019 |
| CN | 110650502 | A | 1/2020 |
| EP | 4132023 | A1 | 2/2023 |
| EP | 4132093 | A1 | 2/2023 |
| KR | 10-2017-0016949 | A | 2/2017 |
| WO | 2021/098123 | A1 | 5/2021 |
| WO | 2022/027165 | A1 | 2/2022 |
| WO | 2022/082570 | A1 | 4/2022 |
| WO | 2023/015517 | A1 | 2/2023 |

OTHER PUBLICATIONS

ZTE, "KI#7, new solution multicast MBS session handover with Dummy QoS Flow," SA WG2 Meeting #S2-139E, S2-2003962, Jun. 1-12, 2020, Electronic, Elbonia (4 pages).

International Search Report and Written Opinion for International Application No. PCT/CN2020/092227, mailed on Feb. 10, 2021, 8 pages.

3GPP TR 23.757 V0.3.0, section 6.3.1.2, "Study on architectural enhancements for 5G multicast-broadcast services," Jan. 29, 2020, 37 pages.

Ericsson, "Centralised User Plane—Dual Connectivity," 3GPP TSG RAN WG3 Meeting #99, R3-181267, Athens, Greece, Feb. 26-Mar. 2, 2018, 7 pages.

Office Action for Korean Patent Application No. 10-2022-7041612, mailed Oct. 20, 2023, with English summary (12 pages).

KIPO, Notice of Allowance for Korean Application No. 10-2022-7041612, mailed on Aug. 26, 2024, 7 pages with unofficial English translation.

CNIPA, First Office Action for Chinese Application No. 202080101416.6, mailed on Apr. 16, 2025, 12 pages with unofficial English translation.

Communication pursuant to Article 94(3) EPC for European Patent Application No. 20895390.1, mailed Jan. 29, 2026 (7 pages).

* cited by examiner

100

200

300

400

450

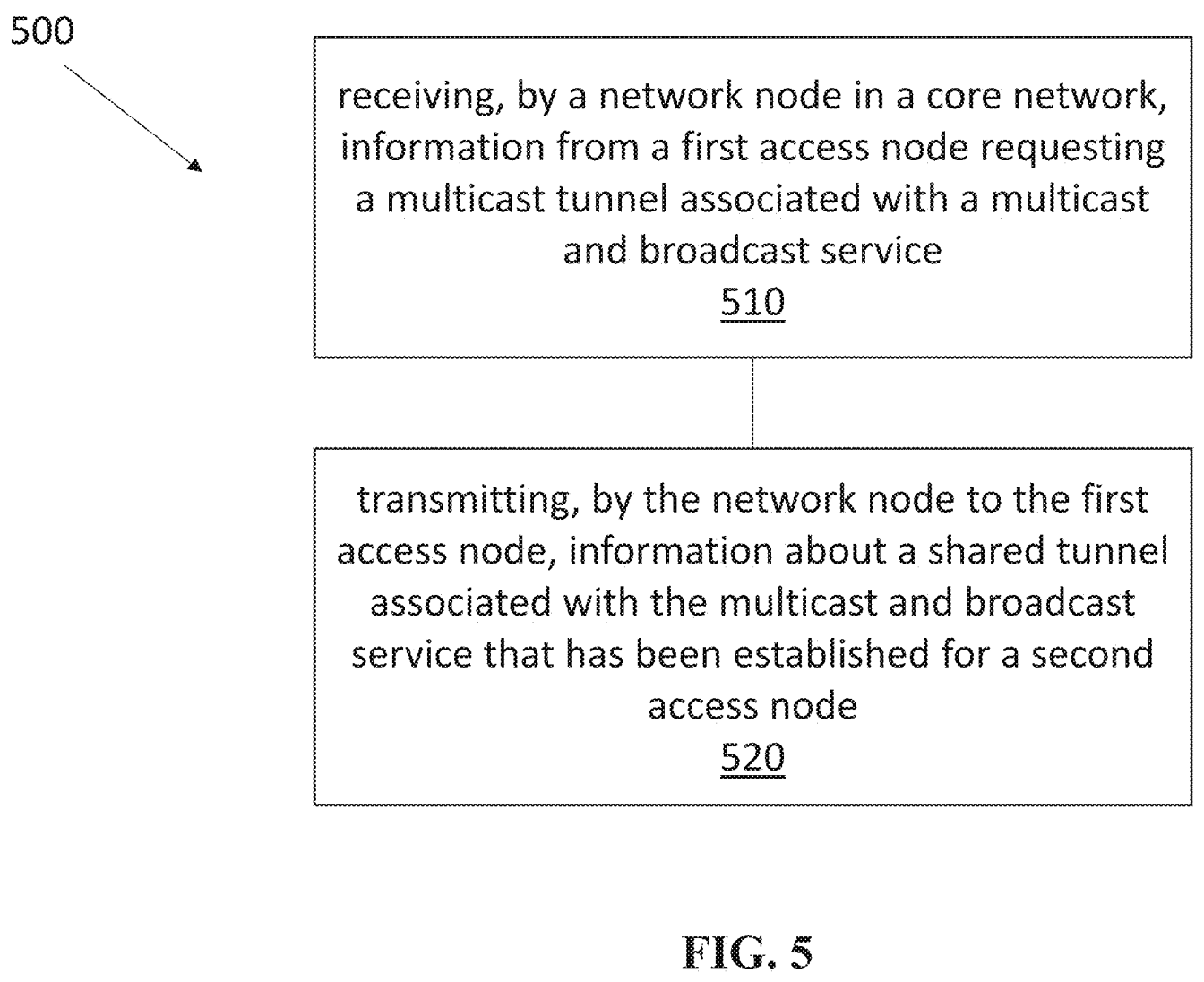

500 receiving, by a network node in a core network, information from a first access node requesting a multicast tunnel associated with a multicast and broadcast service
510 transmitting, by the network node to the first access node, information about a shared tunnel associated with the multicast and broadcast service that has been established for a second access node
520

FIG. 5

Figure 6:
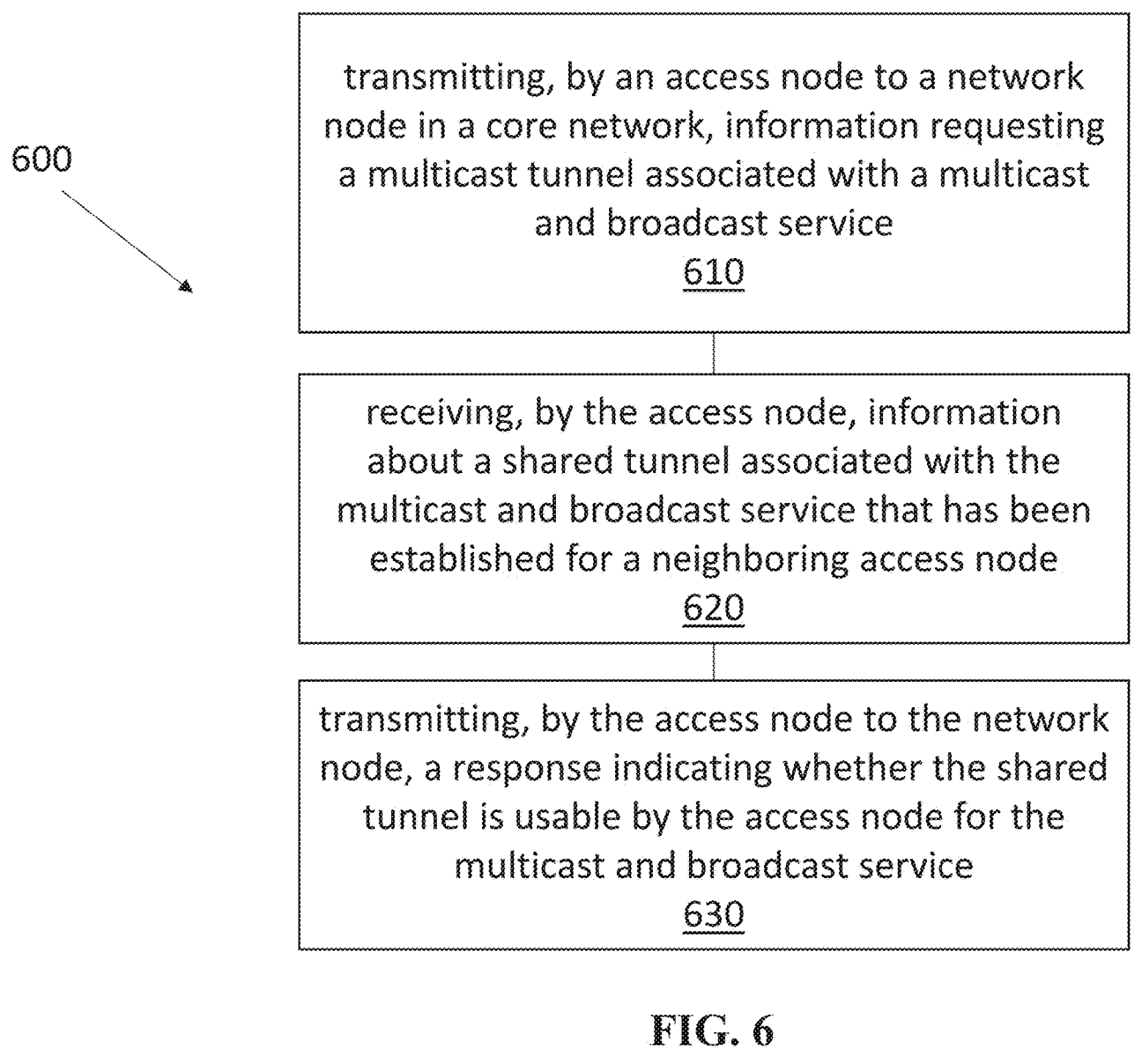

600 transmitting, by an access node to a network node in a core network, information requesting a multicast tunnel associated with a multicast and broadcast service
610 receiving, by the access node, information about a shared tunnel associated with the multicast and broadcast service that has been established for a neighboring access node
620 transmitting, by the access node to the network node, a response indicating whether the shared tunnel is usable by the access node for the multicast and broadcast service
630

Figure 7:
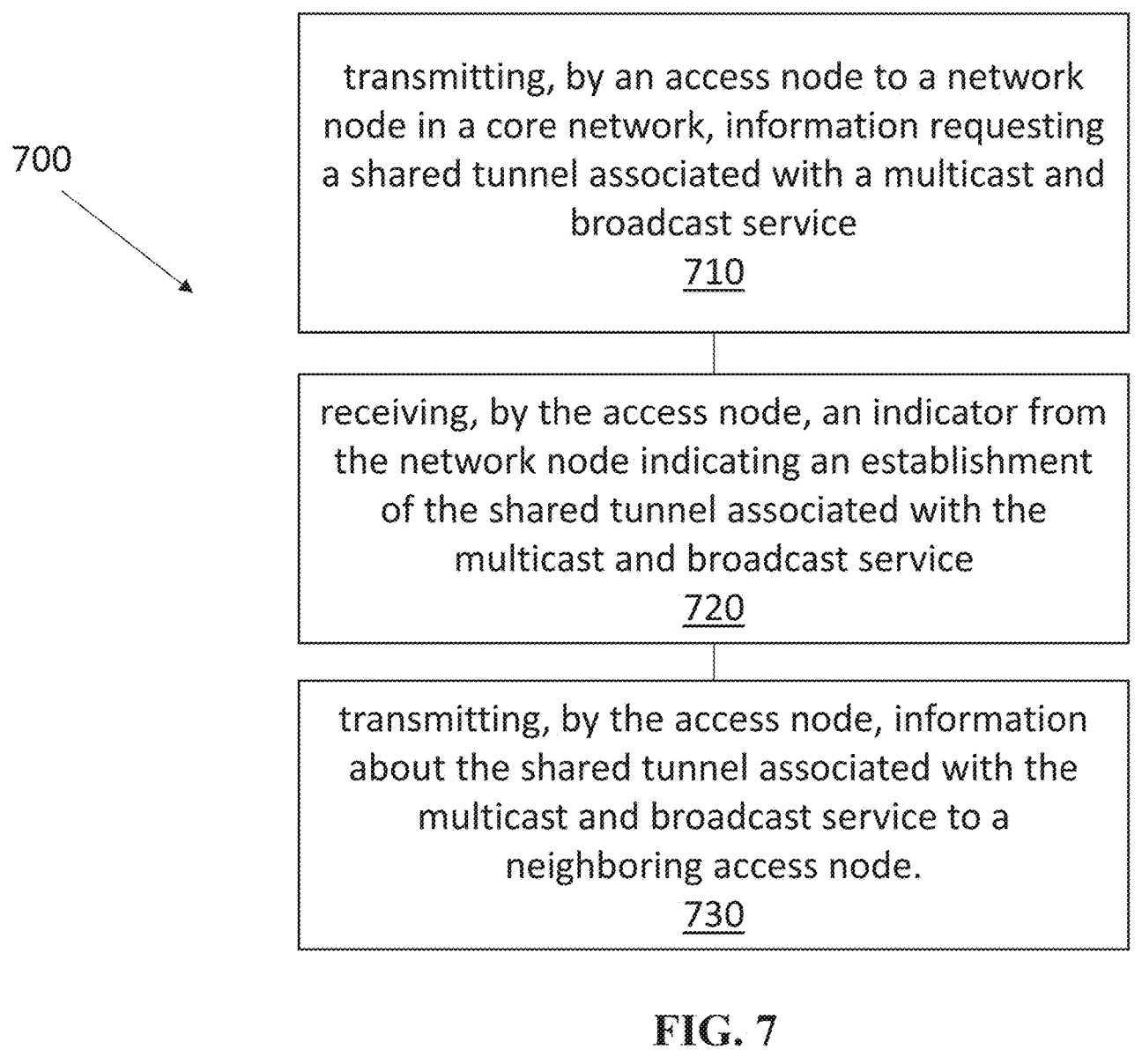

FIG. 6 transmitting, by an access node to a network node in a core network, information requesting a shared tunnel associated with a multicast and broadcast service
710 receiving, by the access node, an indicator from the network node indicating an establishment of the shared tunnel associated with the multicast and broadcast service
720 transmitting, by the access node, information about the shared tunnel associated with the multicast and broadcast service to a neighboring access node.
730

TUNNEL REUSE FOR MULTICAST AND BROADCAST SERVICE

CROSS REFERENCE TO RELATED APPLICATIONS

This patent document is a continuation of and claims benefit of priority to International Patent Application No. PCT/CN2020/092227, filed on May 26, 2020. The entire content of the before-mentioned patent application is incorporated by reference as part of the disclosure of this application.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques related to effectively reuse existing multicast or shared tunnel created for access nodes that share the same user plane resources, thereby preserving network resources and reducing signaling overhead.

In one example aspect, a wireless communication method is disclosed. The method includes receiving, by a network node in a core network, information from a first access node requesting a multicast tunnel associated with a multicast and broadcast service; and transmitting, by the network node to the first access node, information about a shared tunnel associated with the multicast and broadcast service that has been established for a second access node.

In another example aspect, a wireless communication method is disclosed. The method includes transmitting, by an access node to a network node in a core network, information requesting a multicast tunnel associated with a multicast and broadcast service. The method includes receiving, by the access node, information about a shared tunnel associated with the multicast and broadcast service that has been established for a neighboring access node. The method also includes transmitting, by the access node to the network node, a response indicating whether the shared tunnel is usable by the access node for the multicast and broadcast service.

In another example aspect, a wireless communication method is disclosed. The method includes transmitting, by an access node to a network node in a core network, information requesting a shared tunnel associated with a multicast and broadcast service. The method includes receiving, by the access node, an indicator from the network node indicating an establishment of the shared tunnel associated with the multicast and broadcast service. The method also includes transmitting, by the access node, information about the shared tunnel associated with the multicast and broadcast service to a neighboring access node.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

BRIEF DESCRIPTION OF DRAWINGS

FIG. 5 is a flowchart representation of a method for wireless communication in accordance with the present technology.

FIG. 6 is a flowchart representation of a method for wireless communication in accordance with the present technology.

FIG. 7 is a flowchart representation of a method for wireless communication in accordance with the present technology.

DETAILED DESCRIPTION

Section headings are used in the present document only to improve readability and do not limit scope of the disclosed embodiments and techniques in each section to only that section. Certain features are described using the example of Fifth Generation (5 G) wireless protocol. However, applicability of the disclosed techniques is not limited to only 5 G wireless systems.

Figure 1:
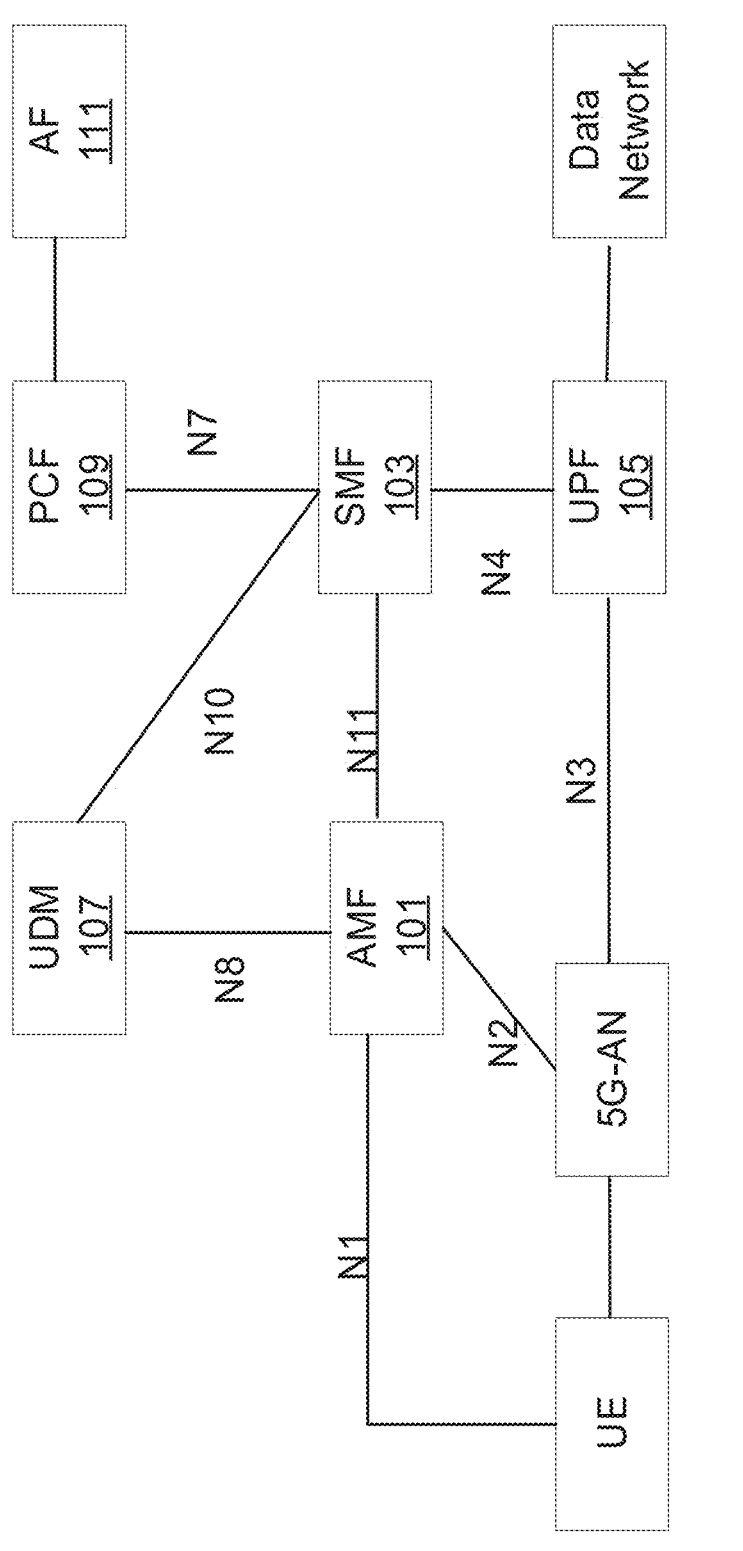
FIG. 1 illustrates an example architecture of a Fifth-Generation (5 G) system.

In telecommunications, 5 G is the fifth-generation technology standard for cellular networks to provide connectivity to wireless communication devices. The 5 G communication systems provide many network functions. FIG. 1 illustrates an example architecture 100 of a 5 G system. The illustrated architecture 100 includes the following network functions:

1. The Access and Mobility Management function (AMF) 101. The AMF 101 is responsible for User Equipment (UE) mobility management, reachability management, and/or connection management, etc. The AMF terminates the Radio Access Network (RAN) Control Plane (CP) N2 interface and the Non-Access Stratum (NAS) N1 interface. It also distributes the Session Manager (SM) NAS to the proper Session Management Functions (SMFs) via the N11 interface.

2. The Session Management function (SMF) 103. The SMF 103 is responsible for UE Internet Protocol (IP) address allocation and management, selection and control of User Plane (UP) function, and/or Protocol Data Unit (PDU) connection management, etc.

3. The User plane function (UPF) 105. The UPF 105 is the anchor point for Intra-/Inter-RAT mobility and the external PDU session point of interconnect to data networks. The UPF also routes and forwards the data packet as the indication from the SMF. The UPF 105 buffers the downlink data when the a is in the idle mode.

4. The Unified Data Management (UDM) 107. The UDM 107 manages subscription profiles for the UEs. Subscription data includes data used for mobility management (e.g. restricted area), session management (e.g. Quality of Service profile per slice per Data Network Name). The subscription data also includes the slice selection parameters which is used for AMF to select a proper SMF 103. The AMF 101 and SMF 103 get the subscription data from the UDM 107. The subscription data is stored in the Unified Data Repository (UDR) (not shown). The UDM 107 uses such data upon reception of request from AMF 101 or SMF 103.

5. The Policy Control Function (PCF) 109. The PCF 109 generates the policy to govern network behavior based on the subscription and indication from Application Function (AF) 111. It also provides policy rules to CP functions (e.g., AMF 101 and/or SMF 103) for enforcement. The PCF can access the UDR to retrieve the policy data.

6. The Network Exposure Function (NEF) (not shown). The NEF is deployed optionally for exchanging information between the 5 G core network (also referred to as 5 GC) and the external third party. In this case, the AF 111 can store the application information in the UDR via NEF.

Figure 2:
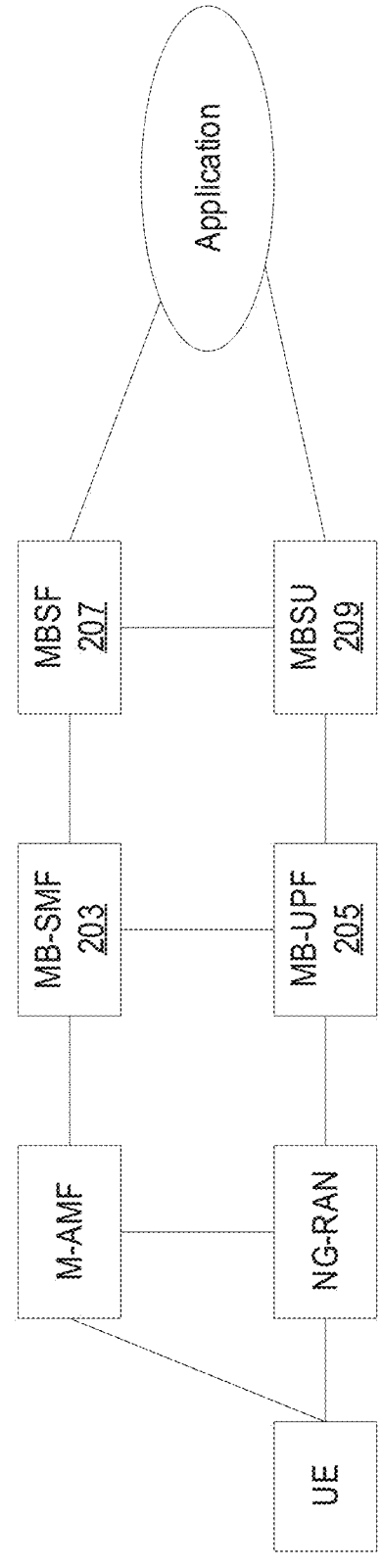
FIG. 2 illustrates an example architecture for providing multicast and broadcast services.

With the development of 5 G technology, 5 G communication systems can provide multicast-broadcast services for different businesses related to public safety, autonomous driving, and/or Internet of Things (IoT). FIG. 2 illustrates an example architecture for providing multicast and broadcast services. The illustrated architecture 200 includes network functions such as the Multicast/Broadcast SMF (MB-SMF) 203 and/or the Multicast/Broadcast UPF (MB-UPF) 205 that are enhanced to support the multicast/broadcast service. The architecture 200 also includes the following network functions:

1. The Multicast/Broadcast Service Function (MBSF) 207. The MBSF 207 is a new Network Function to manage signaling for the service layer capability. It also provides an interface to the Application Server or content provider.

2. The Multicast/Broadcast Service User Plane (MBSU) 209. The MBSU 209 is new entity to manage the payload data for the service layer capability. The MBSU 209 can be a standalone entity or collocated with MBSF or MB-UPF.

Furthermore, new architectures and new features of the base station (also referred to as gNB) have also been introduced to 5 G communication systems. For example, the interface between different gNBs is called the Xn interface, as compared to the X2 interface between base stations in LTE communication systems (also referred to as eNBs). In addition, a gNB can be split into two parts: a Central Unit (CU) and a Distributed Unit (DU). A gNB-CU can be further divided into two parts: Control Plane (CP) CU and User Plane (UP) CU. The interface between the gNB-CU and gNB-DU is called the F1 interface, while the interface between the gNB-CU-CP and gNB-CU-UP is called the E1 interface.

Figure 3:
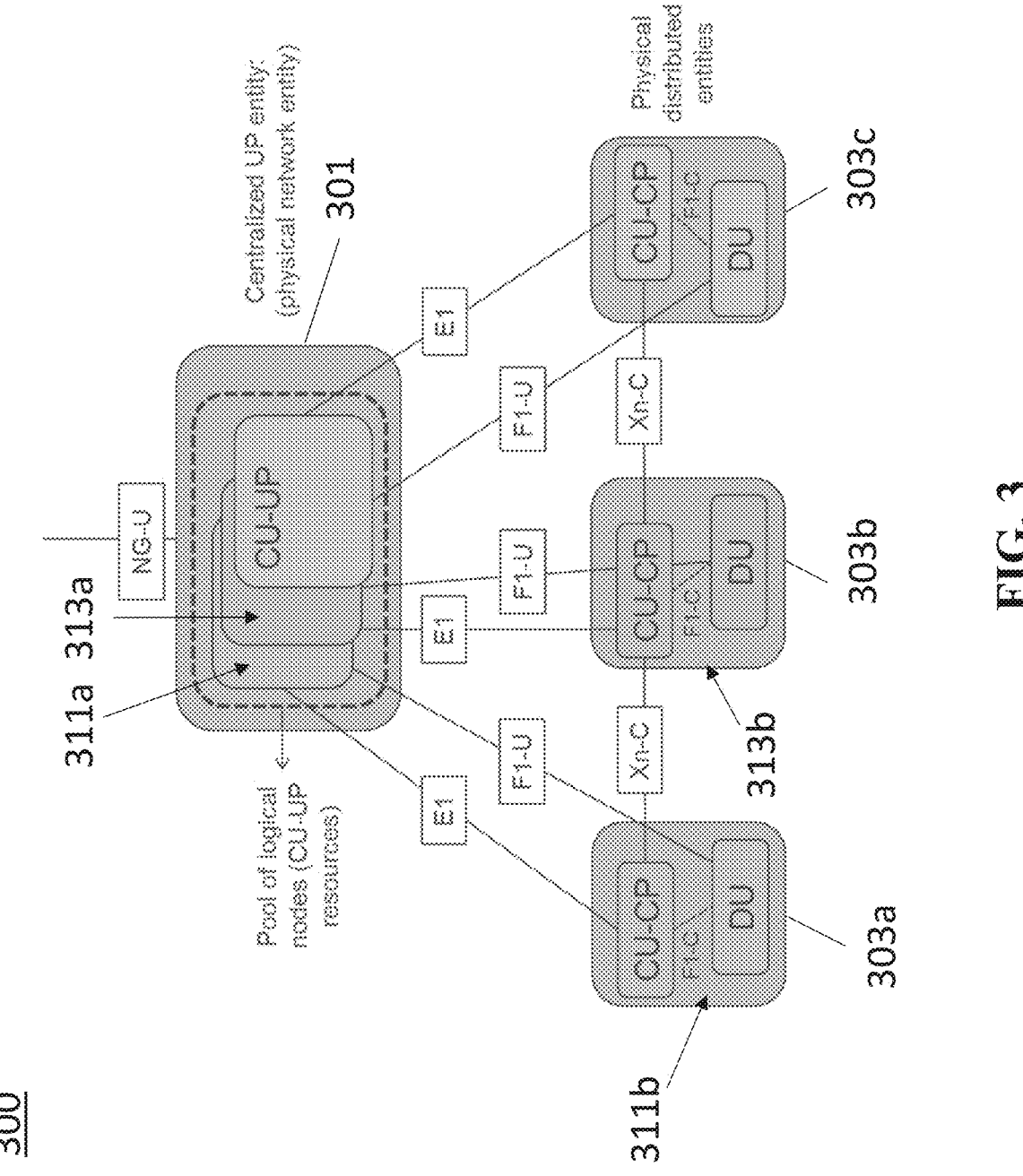
FIG. 3 illustrates an example deployment of 5 G systems in accordance with the present technology.

The introduction of CU/DU split and CP-UP separation allows different variations of deployment scenarios in 5 G systems. FIG. 3 illustrates an example deployment of 5 G systems in accordance with the present technology. In some embodiments, a pool of logical CU-UP entities can be physically located in the same centralized location 301 while the CU-CP entities 303a, 303b, 303c are physically distributed. With such deployment, it is possible to perform a handover where the source and the target logical UP entities are within the same physical central UP entity 301. This offers the possibility of optimizing the inter-node handover procedure by (1) avoiding the need for changing the NG-U tunnel toward the core network, and (2) avoiding the need for data forwarding from source to target UP entity.

For example, as shown in FIG. 3, a UE can perform a handover from a source gNB (311a and 311b) to a target gNB (313a and 313b), where the source CU-UP (311a) and the target CU-UP (313a) are within the same physical central UP entity 301. There is no need for the physical central UP 301 to change the DL UP termination of the NG interface and data forwarding can be sorted out internally at the physical central UP entity 301.

Figure 4A:
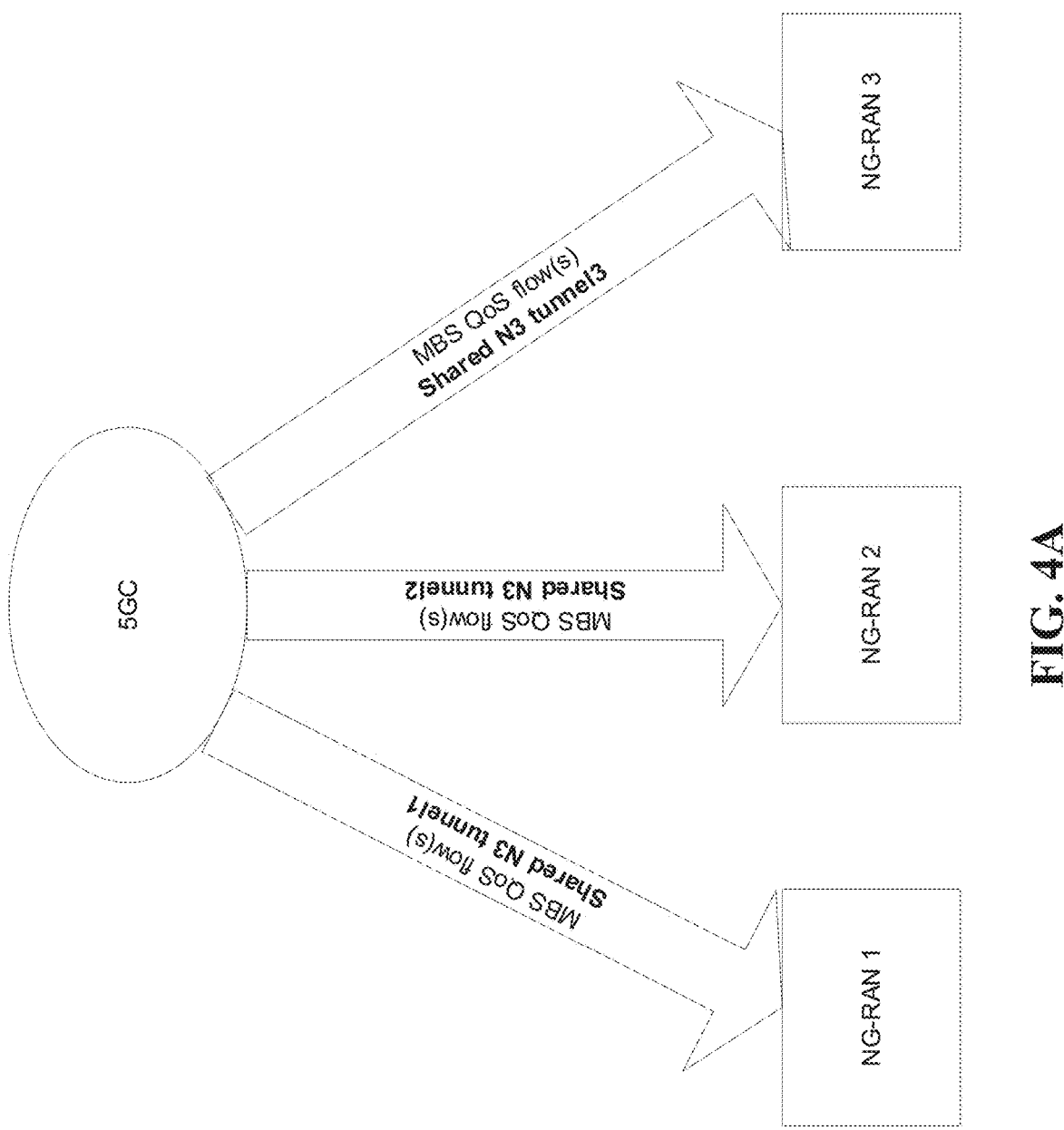
FIG. 4A illustrates a conventional 5 G network deployment for Multicast and Broadcast Services (MBSs).
Figure 4B:
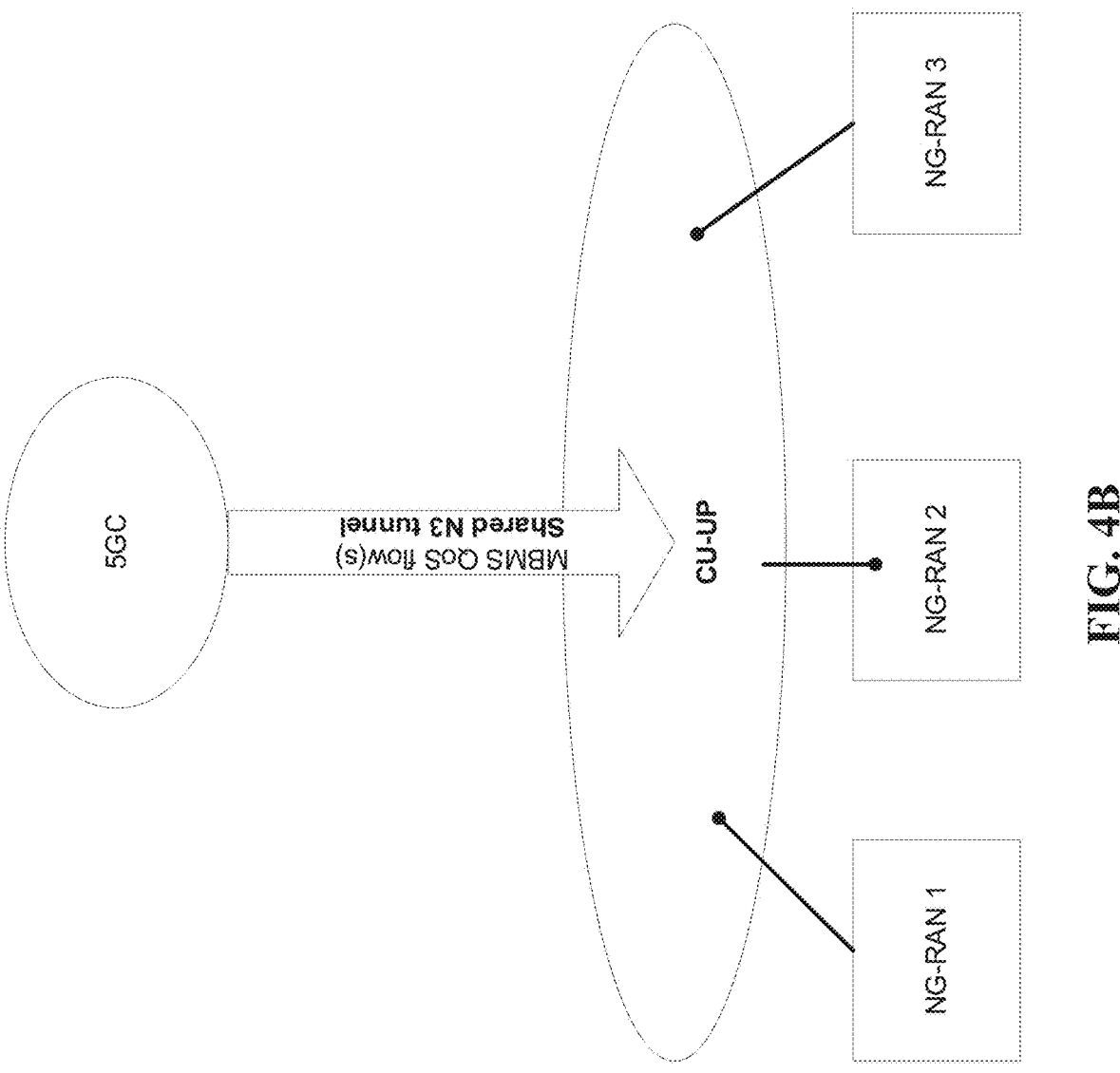
FIG. 4B illustrates an example 5 G network deployment for MBS in accordance with the present technology.

FIG. 4A illustrates a conventional 5 G network deployment 400 for Multicast and Broadcast Services (MBSs). An MBS includes one or more MBS Quality of Service (QoS) flows. As shown in FIG. 4A, the 5 GC (e.g., the UPF) establishes an N3 tunnel with each New Generation Radio Access Network (NG-RAN) node. A UE can camp on a cell that belongs to an NG-RAN1 when the network allows the UE to join an MBS service that includes the one or more MBS QoS flows. If the MBS service has been established for the NG-RAN1 node, the NG-RAN1 node already has a multicast/shared N3 tunnel used for transmitting user data for the MBS service. There is no need for the 5 GC to establish the N3 tunnel again the UE. However, if the multicast/shared N3 tunnel has not been established for the NG-RAN1 node, the 5 GC establishes the tunnel so that user data of the MBS service can be transmitted to the UE from a network node (e.g., the UPF). In this deployment, the 5 GC needs to establish separate N3 tunnels for each NG-RAN node providing the MBS service. It is noted that one N3 tunnel can serve one or more MBS FIG. 4B illustrates an example 5 G network deployment 450 for MBS in accordance with the present technology. CU/DU split and CP/UP separation are adopted in this deployment such that NG-RAN nodes share the user plane resources (e.g., a common UP resource pool as shown in FIG. 3). Only one N3 tunnel is needed between the 5 GC (e.g., the UPF) and the NG-RAN nodes. If the multicast/shared N3 tunnel has been established for one NG-RAN node (e.g., NG-RAN 1), there is no need to re-establish additional N3 tunnel for other NR-RAN nodes.

Using the example deployment shown in FIG. 4B, fewer N3 tunnel needs to be established. However, currently, the 5 GC is not aware of which NG-RAN nodes share the same user plane resources. Therefore, the 5 GC can redundantly establish N3 tunnels even when they are not necessary. This patent document discloses techniques that can be implemented in various embodiments to allow NG-RAN nodes that share the same user plane resources to reuse existing N3 tunnels (if there is any), thereby reducing signaling cost and saving network resources. Some examples of the disclosed techniques are further described in the following example embodiments.

Embodiment 1

In some embodiments, a UE can camp on a cell belonged to a first access node (e.g., NG-RAN1). The UE is allowed to join a particular multicast and broadcast service (MBS) that includes one or more MBS QoS flow(s). A network node (e.g., the UPF) within the 5 GC receives a request from the first access node and decides to establish whether it needs to establish a shared channel for the one or more QoS flows in the first access node for this UE.

If a shared tunnel for the one or more QoS flows of the MBS has already been established for the first access node, the network node can notify the first access node (e.g., NG-RAN1) to use the existing shared tunnel. However, if no shared tunnel has been established for the first access node but there is another share tunnel established for a second access node (e.g., NG-RAN2), the network node can transmit such information to the first access node.

Subsequently, the network node can receive information from the first access node that allows the network node to decide whether establishing a new multicast/shared channel is necessary. For example, the information can indicate whether the existing shared tunnel for the second access node (e.g., NG-RAN2) is usable by the first access node (e.g., NG-RAN1). The information can be a simple indicator having a binary value indicating whether the existing tunnel is usable or not. The information can also indicate whether the first and second access nodes share the same user plane resources for the one or more QoS flow. If the two access nodes share the same user plane resources, the existing tunnel established for the second access node can be reused by the first access node. The network node can decide whether to establish a new shared channel for the first access node based on the information.

FIG. 5 is a flowchart representation of a method 500 for wireless communication in accordance with the present technology. The method 500 includes, at operation 510, receiving, by a network node (e.g., the UPF) in a core network (e.g., the 5 GC), information from a first access node requesting a multicast tunnel associated with a multicast and broadcast service. The method 500 also includes, at operation 520, transmitting, by the network node to the first access node, information about a shared tunnel associated with the multicast and broadcast service that has been established for a second access node (e.g., NG-RAN2).

In some embodiments, the shared tunnel is associated with at least one other multicast and broadcast service (that is, the shared tunnel can serve one or more MBS). In some embodiments, the multicast tunnel is for one or more Quality of Service (QoS) flows of the multicast and broadcast service. In some embodiments, the method includes determining, by the network node, whether to establish the multicast tunnel associated with the multicast and broadcast service for the first access node.

In some embodiments, the method further includes receiving, by the network node, a response from the first access node indicating whether the shared tunnel associated with the multicast and broadcast service or the QoS flow of the multicast and broadcast service is usable by the first access node, and establishing, by the network node, a separate tunnel for the first access node upon determining, based on the response, that the shared tunnel is unusable by the first access node.

In some embodiments, whether the shared tunnel is usable by the first access node is determined based on whether the first access node and the second access node share a same user plane resource for the multicast and broadcast service or the QoS flow of the multicast and broadcast service.

Embodiment 2

In some embodiments, a UE can camp on a cell that belongs to a first access node (e.g., NG-RAN1). The UE is allowed to join a particular multicast and broadcast service that includes one or more MBS QoS flow(s). The first access node sends a request to a network node (e.g., the UPF) within the 5 GC to request a multicast/shared channel for the one or more MBS QoS flows.

If a shared tunnel for the one or more QoS flows of the MBS has already been established for the first access node, the network node can notify the first access node (e.g., NG-RAN1) to use the existing shared tunnel. However, if no shared tunnel has been established for the first access node but there is another share tunnel established for a second access node (e.g., NG-RAN2), the first access node can receive information from the network node indicating so.

For example, the network node can send information about the established shared tunnel information, such as a MBS service identifier, a Tunnel Endpoint Identifier (TEID) of the tunnel, and/or the node identity of the second access node (e.g., NG-RAN2) to the first access node (e.g., NG-RAN1). Upon receiving the information, the first access node determines whether the second access node shares the same user plane resources for this particular MBS. If the same user plane resources are used, the first access can determine that the existing shared channel is reusable. The first access node then notifies the network node in 5 GC whether it can reuse the established shared tunnel or not.

If the established shared tunnel cannot be reused by the first access node, the network node in the core network can establish a new share tunnel for the one or more QoS flows of the MBS for the first access node.

FIG. 6 is a flowchart representation of a method 600 for wireless communication in accordance with the present technology. The method 600 includes, at operation 610, transmitting, by an access node (e.g., NG-RAN1) to a network node (e.g., UPF) in a core network (e.g., 5 GC), information requesting a multicast tunnel associated with a multicast and broadcast service. The method 600 includes, at operation 620, receiving, by the access node, information about a shared tunnel associated with the multicast and broadcast service that has been established for a neighboring access node (e.g., NG-RAN2). The method 600 also includes, at operation 630, transmitting, by the access node to the network node, a response indicating whether the shared tunnel is usable by the access node for the multicast and broadcast service.

In some embodiments, the shared tunnel is associated with at least one other multicast and broadcast service (that is, the shared tunnel can serve one or more MBS). In some embodiments, the multicast tunnel is for one or more Quality of Service (QoS) flows of the multicast and broadcast service. In some embodiments, the method includes determining whether the shared tunnel is usable by the access node based on whether the access node and the neighboring access node share a same user plane resource for the multicast and broadcast service or the one or more QoS flows of the multicast and broadcast service.

In some embodiments, the information about the shared tunnel associated with the multicast and broadcast service comprises a tunnel endpoint identifier for the shared tunnel. In some embodiments, the information about the shared tunnel associated with the multicast and broadcast service comprises an identifier for at least one of the one or more Quality of Service (QoS) flows associated with the multicast and broadcast service. In some embodiments, the information about the shared tunnel for the multicast and broadcast service comprises an identifier identifying an access node for which the tunnel is established.

Embodiment 3

In some embodiments, a UE can camp on a cell that belongs to a first access node (e.g., NG-RAN1). The UE is allowed to join a particular multicast and broadcast service (MBS) that includes one or more MBS QoS flow(s). A network node (e.g., the UPF) within the 5 GC receives a request from the first access node and decides to establish a shared channel for the one or more QoS flows in the first access node for this UE.

When there is no existing tunnel established for any access nodes, the network node in the 5 GC can establish a multicast/shared tunnel for the one or more QoS flows of the MBS service. The network node can then notify the first access network that the multicast/shared channel has been established.

In some embodiments, upon receiving the notification from the network node, the first access network can transmit information about the newly established multicast/shared tunnel (e.g., TEID of the shared tunnel, the node ID of the first access node, and/or MBS QoS flow IDs) to one or more neighboring access nodes that share the same user plane resources. This way, the neighboring access nodes are aware of the existence of this multicast/shared tunnel. When other UEs camped in the neighboring access nodes are allowed to join the same MBS and request additional tunnels, the neighboring access nodes can reuse this existing tunnel without any signaling exchange with the network, thereby reducing or eliminating any signaling delay and overhead in enabling the MBS.

FIG. 7 is a flowchart representation of a method 700 for wireless communication in accordance with the present technology. The method 700 includes, at operation 710, transmitting, by an access node to a network node in a core network, information requesting a shared tunnel associated with a multicast and broadcast service. The method 700 includes, at operation 720, receiving, by the access node, an indicator from the network node indicating an establishment of the shared tunnel associated with the multicast and broadcast service. The method 700 also includes, at operation 730, transmitting, by the access node, information about the shared tunnel associated with the multicast and broadcast service to a neighboring access node.

In some embodiments, the shared tunnel is associated with at least one other multicast and broadcast service (that is, the shared tunnel can serve one or more MBS). In some embodiments, the tunnel is for one or more Quality of Service (QoS) flows of the multicast and broadcast service. In some embodiments, the method includes receiving, by the access node, a notification from the neighboring access node indicating whether the tunnel is usable by the neighboring access node.

In some embodiments, the information about the shared tunnel associated with the multicast and broadcast service comprises a tunnel endpoint identifier for the tunnel. In some embodiments, the information about the shared tunnel associated with the multicast and broadcast service comprises an identifier for a Quality of Service (QoS) flow associated with the multicast and broadcast service. In some embodiments, the information about the shared tunnel for the multicast and broadcast service comprises an identifier identifying an access node for which the tunnel is established.

Embodiment 4

In some embodiments, the UE joins a particular multicast and broadcast service (MBS) when it camps in a cell that belongs to a first access node (e.g., NG-RAN1). The UE receives user data for the MBS via a multicast/shared tunnel established by the core network. When the UE moves to another cell that belongs to a second access node (e.g., NG-RAN2), a handover occurs. Referring back to FIG. 4B, when the NG-RAN1 and the NG-RAN2 share the same user plane resources (E.G., CU-UP), there is no need to establish a new tunnel for the one or more QoS flows of the MBS during the handover. The UE can simply reuse the same tunnel after the handover without incurring signaling overhead.

Figure 8:
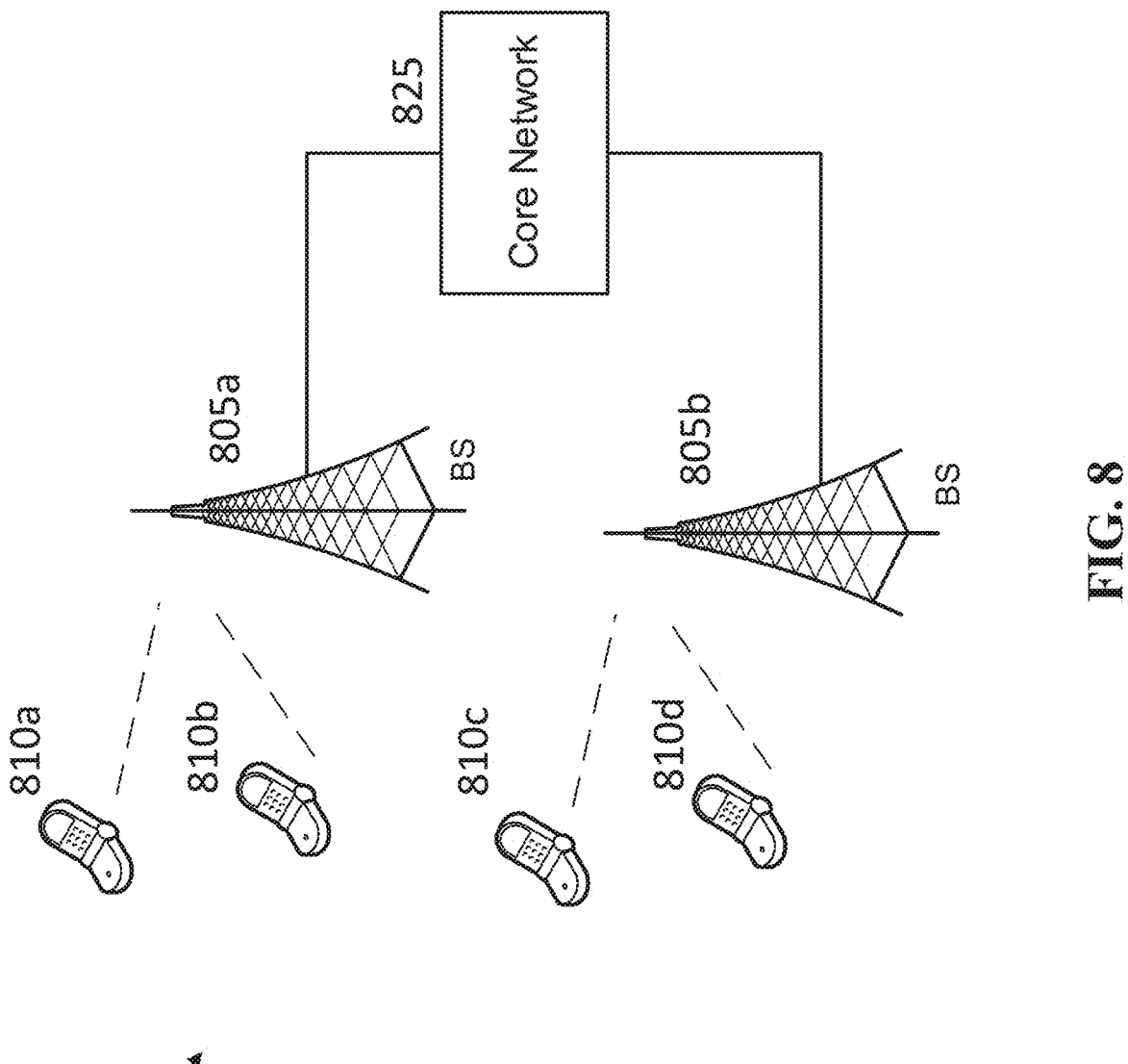
FIG. 8 shows an example of a wireless communication system where techniques in accordance with one or more embodiments of the present technology can be applied.

FIG. 8 shows an example of a wireless communication system 400 where techniques in accordance with one or more embodiments of the present technology can be applied. A wireless communication system 800 can include one or more base stations (BSs) 805_a_, 805_b_, one or more wireless devices 810_a_, 810_b_, 810_c_, 810_d_ , and a core network 825. A base station 805_a_, 805_b_ can provide wireless service to wireless devices 810_a_, 810_b_, 810_c_ and 810_d_ in one or more wireless sectors. In some implementations, a base station 805_a_, 805_b_ includes directional antennas to produce two or more directional beams to provide wireless coverage in different sectors.

The core network 825 can communicate with one or more base stations 805_a_, 805_b_. The core network 825 provides connectivity with other wireless communication systems and wired communication systems. The core network may include one or more service subscription databases to store information related to the subscribed wireless devices 810_a_, 810_b_, 810_c_, and 810_d_. A first base station 805_a_ can provide wireless service based on a first radio access technology, whereas a second base station 805_b_ can provide wireless service based on a second radio access technology. The base stations 805_a_ and 805_b_ may be co-located or may be separately installed in the field according to the deployment scenario. The wireless devices 810_a_, 810_b_, 810_c_, and 810_d_ can support multiple different radio access technologies. The techniques and embodiments described in the present document may be implemented by the base stations of wireless devices described in the present document.

Figure 9:
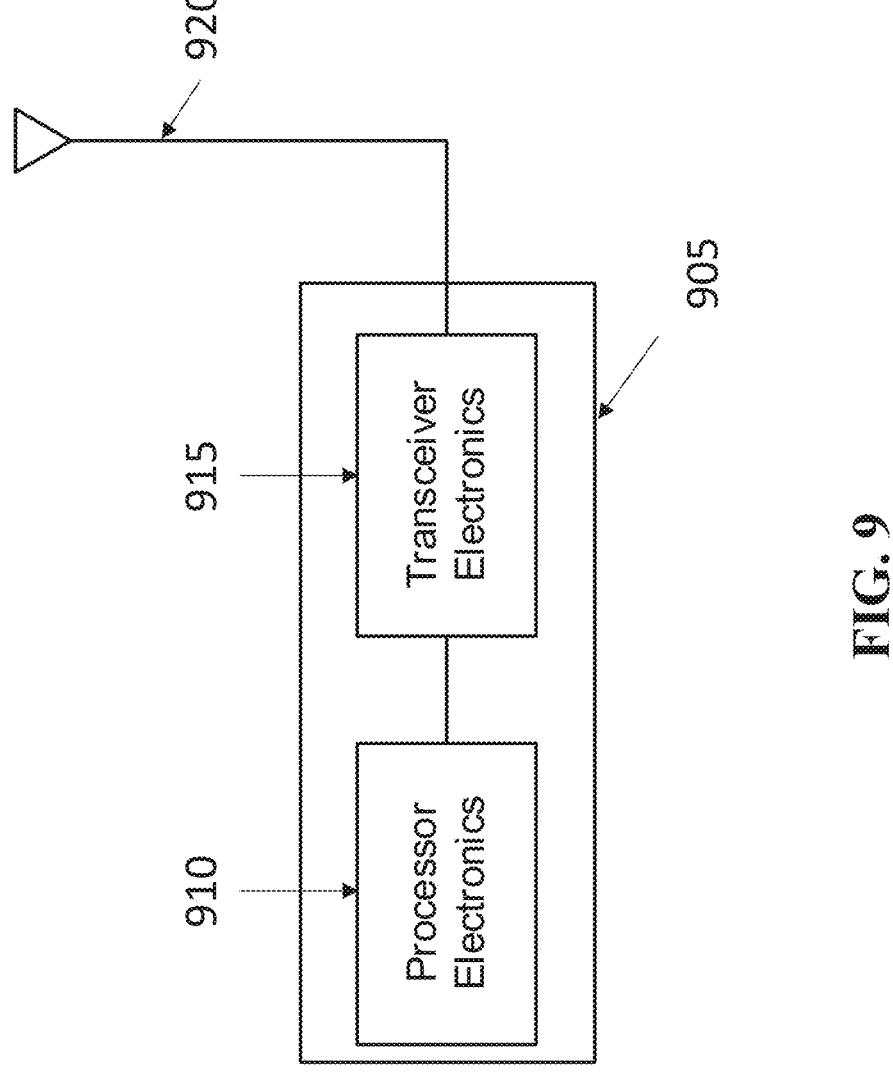
FIG. 9 is a block diagram representation of a portion of a radio station in accordance with one or more embodiments of the present technology can be applied.

FIG. 9 is a block diagram representation of a portion of a radio station in accordance with one or more embodiments of the present technology can be applied. A radio station 905 such as a base station or a wireless device (or UE) can include processor electronics 910 such as a microprocessor that implements one or more of the wireless techniques presented in this document. The radio station 905 can include transceiver electronics 915 to send and/or receive wireless signals over one or more communication interfaces such as antenna 920. The radio station 905 can include other communication interfaces for transmitting and receiving data. Radio station 905 can include one or more memories (not explicitly shown) configured to store information such as data and/or instructions. In some implementations, the processor electronics 910 can include at least a portion of the transceiver electronics 915. In some embodiments, at least some of the disclosed techniques, modules or functions are implemented using the radio station 905. In some embodiments, the radio station 905 may be configured to perform the methods described herein.

It will be appreciated that the present document discloses techniques that can be embodied in various embodiments to enable effective reuse of existing multicast/shared tunnels when the access nodes share the same user plane resources. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method of wireless communication, comprising:
receiving, by a network node in a core network, information from a first access node in a first radio access network (RAN) requesting a multicast tunnel associated with a multicast and broadcast service; and
transmitting, by the network node to the first access node, information about a shared tunnel associated with the multicast and broadcast service that has been established for a neighboring second access node in a second RAN,
wherein the first access node and the neighboring second access node share a same user plane resource for the multicast and broadcast service, and
wherein the shared tunnel established for the neighboring second access node is determined, by the first access node, to be usable by the first access node.

2. The method of claim 1, wherein the shared tunnel is associated with at least one other multicast and broadcast service.

3. The method of claim 1, wherein the multicast tunnel is for one or more Quality of Service (QoS) flows of the multicast and broadcast service.

4. The method of claim 1, comprising:
determining, by the network node, whether to establish the multicast tunnel associated with the multicast and broadcast service for the first access node.

5. The method of claim 3, comprising:
receiving, by the network node, a response from the first access node indicating whether the shared tunnel associated with the multicast and broadcast service or the one or more QoS flows of the multicast and broadcast service is usable by the first access node; and establishing, by the network node, a separate tunnel for the first access node upon determining, based on the response, that the shared tunnel is unusable by the first access node.

6. The method of claim 5, wherein whether the shared tunnel is usable by the first access node is determined based on whether the first access node and the neighboring second access node share the same user plane resource for the multicast and broadcast service or the one or more QoS flows of the multicast and broadcast service.

7. The method of claim 1, wherein the information about the shared tunnel associated with the multicast and broadcast service comprises a tunnel endpoint identifier or an identifier identifying an access node for which the shared tunnel is established.

8. The method of claim 3, wherein the information about the shared tunnel associated with the multicast and broadcast service comprises an identifier for at least one of the one or more Quality of Service (QoS) flows associated with the multicast and broadcast service.

9. A method of wireless communication, comprising:
transmitting, by a first access node in a first radio access network (RAN) to a network node in a core network, information requesting a multicast tunnel associated with a multicast and broadcast service;
receiving, by the first access node, information about a shared tunnel associated with the multicast and broadcast service that has been established for a neighboring second access node in a second RAN, wherein the first access node and the neighboring second access node share a same user plane resource for the multicast and broadcast service; and
transmitting, by the first access node to the network node, a response indicating that the shared tunnel established for the neighboring second access node is usable by the first access node for the multicast and broadcast service.

10. The method of claim 9, wherein the shared tunnel is associated with at least one other multicast and broadcast service.

11. The method of claim 9, wherein the multicast tunnel is for one or more Quality of Service (QoS) flows of the multicast and broadcast service.

12. The method of claim 11, further comprising:
determining whether the shared tunnel is usable by the first access node based on whether the first access node and the neighboring second access node share the same user plane resource for the multicast and broadcast service or the one or more QoS flows of the multicast and broadcast service.

13. The method of claim 9, wherein the information about the shared tunnel associated with the multicast and broadcast service comprises a tunnel endpoint identifier or an identifier identifying an access node for which the shared tunnel is established.

14. The method of claim 11, wherein the information about the shared tunnel associated with the multicast and broadcast service comprises an identifier for at least one of the one or more Quality of Service (QoS) flows associated with the multicast and broadcast service.

15. A method of wireless communication, comprising:
transmitting, by a second access node in a second radio access network (RAN) to a network node in a core network, information requesting a shared tunnel associated with a multicast and broadcast service;
receiving, by the second access node, an indicator from the network node indicating an establishment of the shared tunnel associated with the multicast and broadcast service for the second access node; and
transmitting, by the second access node, information about the shared tunnel associated with the multicast and broadcast service to a neighboring first access node in a first RAN, wherein the neighboring first access node and the second access node share a same user plane resource for the multicast and broadcast service, and
wherein the shared tunnel established for the second access node is determined, by the neighboring first access node, to be usable by the neighboring first access node.

16. The method of claim 15, wherein the shared tunnel is associated with at least one other multicast and broadcast service.

17. The method of claim 15, wherein the shared tunnel is for one or more Quality of Service (QoS) flows of the multicast and broadcast service.

18. The method of claim 15, comprising:
receiving, by the second access node, a notification from the neighboring first access node indicating whether the shared tunnel is usable by the neighboring first access node.

19. The method of claim 15, wherein the information about the shared tunnel associated with the multicast and broadcast service comprises a tunnel endpoint identifier or an identifier identifying an access node for which the shared tunnel is established.

20. The method of claim 17, wherein the information about the shared tunnel associated with the multicast and broadcast service comprises an identifier for at least one of the one or more Quality of Service (QoS) flows associated with the multicast and broadcast service.

* * * * *